March 2, 1926.

J. B. DES ROSIERS 1,575,323

VEHICLE BRAKE CONTROLLING MEANS

Filed June 24, 1925     5 Sheets-Sheet 1

INVENTOR.
John B. Des Rosiers
BY Thomas A. Jenckes Jr.
ATTORNEY.

March 2, 1926.

J. B. DES ROSIERS 1,575,323

VEHICLE BRAKE CONTROLLING MEANS

Filed June 24, 1925   5 Sheets-Sheet 2

INVENTOR.
John B. DesRosiers
BY Thomas A. Jenckes Jr.
ATTORNEY.

March 2, 1926.

J. B. DES ROSIERS 1,575,323

VEHICLE BRAKE CONTROLLING MEANS

Filed June 24, 1925    5 Sheets-Sheet 4

INVENTOR
John B. DesRosiers
BY
Thomas A. Jenks Jr.
ATTORNEY

March 2, 1926.

J. B. DES ROSIERS 1,575,323

VEHICLE BRAKE CONTROLLING MEANS

Filed June 24, 1925    5 Sheets-Sheet 5

INVENTOR
John B. DesRosiers
BY
Thomas A. Jenckes Jr.
ATTORNEY

Patented Mar. 2, 1926.

1,575,323

UNITED STATES PATENT OFFICE.

JOHN B. DES ROSIERS, OF PROVIDENCE, RHODE ISLAND.

VEHICLE BRAKE-CONTROLLING MEANS.

Application filed June 24, 1925. Serial No. 39,297.

REISSUED

*To all whom it may concern:*

Be it known that I, JOHN B. DES ROSIERS, a citizen of the United States, residing at Providence, in the county of Providence and State of Rhode Island, have invented certain new and useful Improvements in Vehicle Brake-Controlling Means, of which the following is a specification.

My invention relates to automobiles and comprises specifically attachments for the brake controller shafts thereof and said attachments in combination with the already existing parts thereof.

Most automobiles are usualy supplied with two different types of braking mechanisms, one usually operated by a foot lever and the other usually operated by a hand lever. A clutch for connecting the power to the driving wheels is also an essential element of automobiles and when the clutch is connected, the motor of the automobile itself provides a very efficient third type of braking means which is especially useful in going down long hills. I am aware that devices for applying both types of braking means simultaneously have heretofore been provided but so far as I am aware no one has heretofore provided the simple combination about to be described. My invention makes possible the combination of one braking means, a second braking means independent of said first braking means, a clutch for connecting the power to the driving wheels (making possible a third braking means, the engine if desired), means for operating said first braking means and disengaging the clutch simultaneously independently of the other braking means (when a sudden stop is desired and it is desired to shut off the power and apply the brakes at once), and means for operating both braking means simultaneously independently of the clutch (thus permitting the motor a third braking means to function in addition to both braking means described, a very desirable condition when going down long hills).

It is thus one object of my invention to provide a device which will permit both brakes to function and the motor to act as a further brake on the engine at the same time.

A further object of my invention is to provide a device which will apply the brakes and disconnect the power at once if a sudden stop is desired.

In practice the foot brake is chiefly used by the operator and the result is that its brake band becomes quickly worn out, while there is practically no wear at all on the other brake. A further object of my invention is to double the stopping efficiency by having both sets of brakes applied at once and to equalize the wear between both sets of brakes. As will become apparent I provide a one-way connection between the foot pedal which operates one brake and the controller shaft which operates the other brake whereby both brakes may be applied on depression of the foot pedal, said connection also permitting the controller shaft brake to be applied alone.

I provide the broad advantages portrayed above in a device which is simplicity itself, which can be applied to already existing automobiles at a very slight cost, which is very easily adjusted and which may be readily attached. In the drawings I have shown an embodiment of my invention specifically adapted for use on a Ford automobile. A Ford automobile has a hand lever projecting upwardly from the usual wheel brake controller shaft and also what Ford terms a speed lever or what I believe might be more aptly termed "a clutch cam" for lifting up the clutch lever to disengage the clutch when drawing back the hand lever into neutral or when applying the emergency brake. I provide a sleeve for the controller shaft and I mount on the one end thereof the usual hand lever which as explained on a Ford T-model is mounted on the controller shaft and on the opposite end thereof the speed lever which as already explained in a Ford T-model is also mounted on the controller shaft and I also rigidly secure to the controller shaft an arm having a rod projecting laterally therefrom adapted to abut the rear edge of the speed lever to cause the controller shaft to rearwardly rotate when said sleeve and speed lever are rearwardly rotated by pulling the hand lever back thus causing the emergency brake to be put on as usual as the clutch is disengaged on rearward rotation of said sleeve. As stated I also connect the transmission brake foot pedal with the controller shaft so as to cause rearward rotation of the controller shaft to apply the emergency brake on depression of the foot pedal which one-way connection also permits the controller shaft to be rearwardly rotated to apply the emergency brake independently of the application of the foot pedal actuated driving mechanism brake.

These and such other objects of my invention as may hereinafter appear will be best understood from a description of the accompanying drawings which illustrate embodiments of my invention adapted for use on a Ford automobile.

In the drawings, wherein like characters of reference indicate like parts throughout, 10 generally indicates the frame of the automobile, 12 the rear axle thereof and 14 the usual rear wheels thereof which are propelled as usual by means of the driving mechanism 16. The driving mechanism 16 contains the usual clutch 18 slidable on the revolving transmission shaft 19, and operated by means of the clutch yoke 21, secured to the oscillatable clutch shaft 44, and transmission brake 20 operated through the shaft 36, the transmission brake and clutch being contained as usual in the transmission cover 22. As explained, I have shown in the drawings the usual construction of a Ford T-model modified to include my invention. The usual controller shaft 24 is suitably mounted on the side beams 26 of the frame 10. The rods 28 for actuating the rear wheel brakes are suitably attached to the ends thereof. I have shown in the drawings levers of the first class 30 rigidly secured to each end of said controller shaft 24, on each end of which are pivoted the rods 28 for actuating the rear wheel brakes and the rods 32 for actuating the front wheel brakes where employed, said construction being that of my co-pending application for controlling means for four wheel brakes Serial #39,296, filed June 24, 1925, though it is obvious that my invention may be connected to apply brakes to the rear wheels alone as does the usual Ford construction. As explained, one braking means is usually actuated by this controller shaft, in Fords and in most automobiles being the brake on the rear wheels or so-called emergency brake.

34 represents the usual brake foot pedal which is pivotally mounted on the shaft 36 to actuate the brake 20 on the driving mechanism, in Fords and commonly a brake on the transmission. 38 represents the usual clutch pedal which in Fords when released is in high speed and when fully depressed is in low speed. The clutch pedal 38 is connected through the medium of the slow speed connection 40 to one end of the clutch lever 42 pivoted as usual on the clutch shaft 44. The clutch lever 42 has at its upper end the clutch lever screw 46 which in the usual construction is adapted to abut what Ford terms "the speed lever" 48, or what might be more aptly termed the clutch cam which is on the end of the speed lever arm 50 mounted on the controller shaft 24. In the usual Ford construction the hand lever 52 for rotating the controller shaft 24 is mounted on said shaft 24 exterior of the frame 10 and is provided with the rack 54 and usual releasing handle 56 so that said lever 52 and integral controller shaft 24 may be locked in any desired position.

Figure 1:
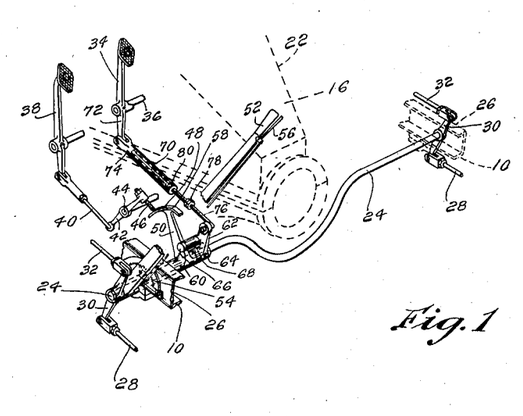
Fig. 1 is a diagrammatic perspective view of the controller shaft and adjacent parts of the Ford automobile having my invention attached, with the sleeve rearwardly rotated to apply the emergency brake and disconnect the clutch independently of the transmission brake.
Figure 2:
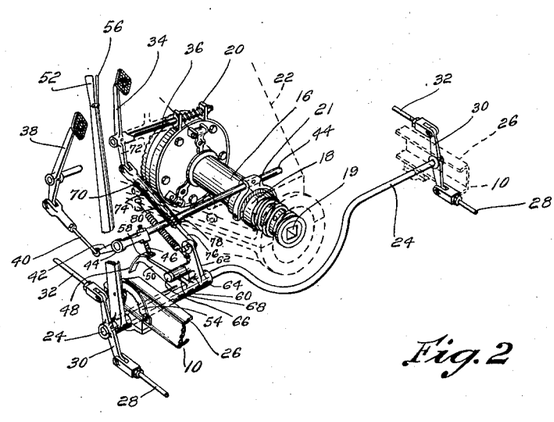
Fig. 2 is a view similar to Fig. 1 showing the emergency brake entirely off and with the clutch lever in high, showing the clutch and transmission brake in detail.
Figures 3, 4, 5:
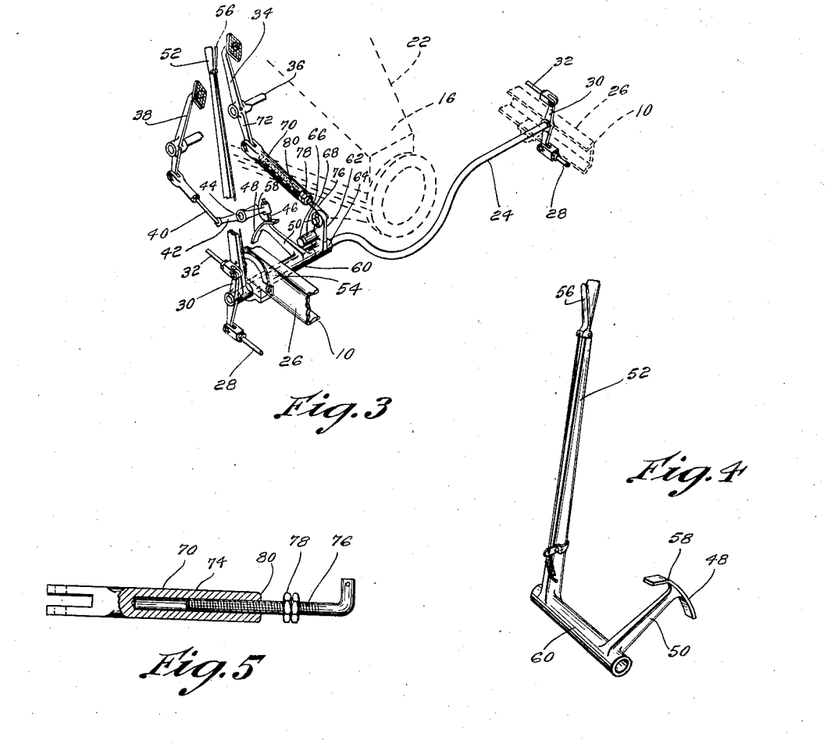
Fig. 3 is a view similar to Fig. 1 showing the emergency brake lever way off, the clutch lever in high but with the foot pedal depressed so as to apply both the transmission brake and also through the medium of the one-way connection to revolve the controller shaft to apply the wheel brakes.
Fig. 4 is a perspective view of the controller shaft sleeve showing the hand lever and speed lever integrally attached thereto.
Fig. 5 is a plan view partially shown in section, of the one-way operative sliding bearing.
Figure 6:
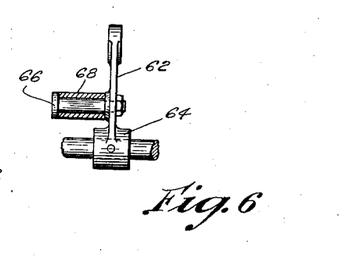
Fig. 6 is a rear elevation of the arm adapted to be rigidly secured to the controller shaft and having a rod projecting laterally therefrom.
Figure 7:
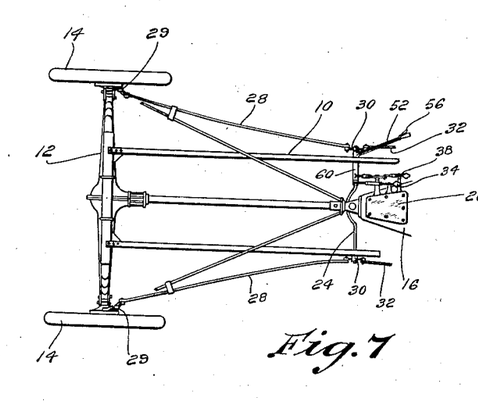
Fig. 7 is a plan view of the rear half of the chassis of the automobile.
Figure 8:
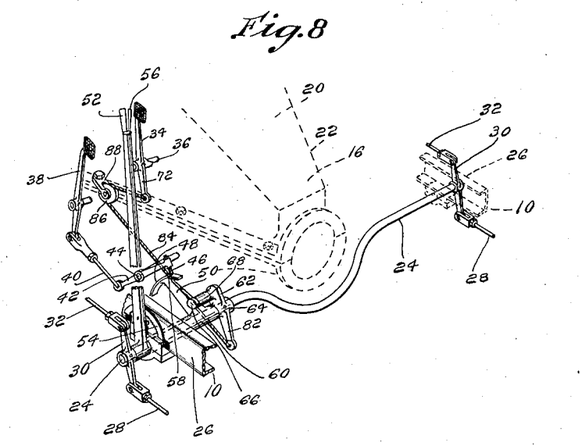
Fig. 8 is a perspective view similar to Fig. 1 of my invention showing a modified type of one-way connection between the controller shaft and foot pedal, the hand lever being retracted so as to disconnect the clutch but not far enough to apply any brakes.

So much of the construction heretofore described is common on all Ford T-models but the simple attachment I provide modifies this usual construction to accomplish the results portrayed above. I provide a sleeve 60 for the left hand side of said controller shaft adapted to extend from the left hand end thereof to a point normally adjacent to that of the speed lever 50 and on this sleeve 60 I mount the usual hand lever 52 on the outer end thereof and on the inner end thereof I mount the usual speed lever 50. As shown in Fig. 4 in my preferred embodiment, the hand lever 52 and speed lever 51 are preferably constructed integral with the sleeve. It is obvious therefore that when the sleeve 60 is rearwardly rotated through the medium of the hand lever 52 that due to the sharpness 58 of the crank cam 48 at first the clutch will be immediately disengaged and on further rearward rotation of said sleeve 60, the speed lever 50 will tend to move into a further backward position to apply the wheel brakes. To provide means whereby the controller shaft 24 may also be rearwardly rotated on rearward revolution of said sleeve 60, I provide the additional attachment about to be described shown in detail in Fig. 6. This comprises an arm 62 having a collar 64 at one end thereof for rigid securement to the controller shaft 24 and a rod 66 projecting sidewise therefrom. As shown in my preferred embodiment said rod 66 preferably has a roller sleeve 68 mounted thereon. Said arm 62 is rigidly secured to the controller shaft 24 adjacent to the inner end of the sleeve 60. It is obvious that as the sleeve 60 is rearwardly rotated, the rear edge of the speed lever 50 will abut the laterally projecting rod 66 thereby through the medium of the arm 62 causing the controller shaft 24 to rearwardly rotate to apply the wheel brakes 29 through the medium of the rod 28.

To permit the brake foot pedal 34 on depression thereof to apply the wheel brakes 29 in addition to the transmission brake 20 I provide the connection about to be described, which operates on the setting of the transmission brake to rearwardly rotate the controller shaft 24 to apply the wheel brake, said connection being inoperable to apply the driving mechanism brake on independent rotation of the controller shaft 24 caused by drawing the hand lever 52 backward, consequent rearward rotation of the sleeve 60, backward movement of the integral speed lever 50 and rearward rotation of the shaft 24 by contact of the speed lever 50 with the rod 66 of the arm 62. While any type of one way operative means may be provided for this purpose, I preferably employ the sliding bearing 70. I provide the foot pedal 34 with the downward extension 72 and I pivot thereon the sleeve 74. I pivot on the upper end of the arm 62 the rod 76 which rod 76 is adapted to reciprocate in said sleeve 74 and is provided with the adjustable stop 78 thereon which may comprise the nut 78 threaded on the forward end of said rod 76. It is obvious that on depression of the foot pedal 54 the sleeve 70 is thereby pushed rearward until the rear end 80 thereof abuts the stop 78 on the rod 76 thereby causing the arm 62 to move backwards and rearwardly rotate the controller shaft 24, thus applying the wheel brakes 29 in addition to the transmission brake 20. As the controller shaft 24 is rearwardly rotated through the medium of the hand lever 52 as explained, it is obvious that the rod 76 will merely slide backwards within the sleeve 74 without in any way affecting the operation of the foot pedal 34 or transmission brake 20.

Figure 9:
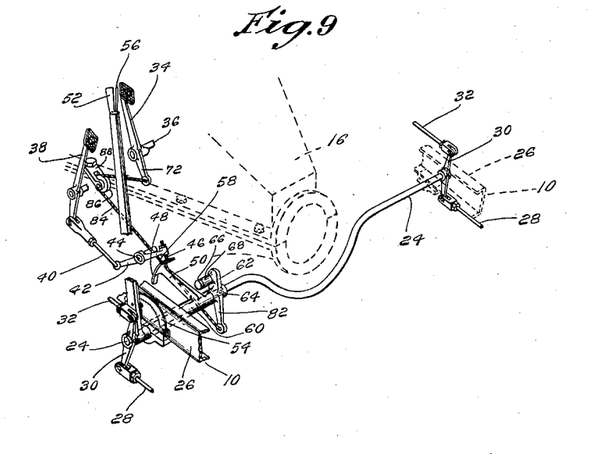
Fig. 9 is a perspective view similar to Fig. 8 of the modified form shown therein with the foot pedal depressed so as to apply both the transmission and wheel brakes.
Figure 10:
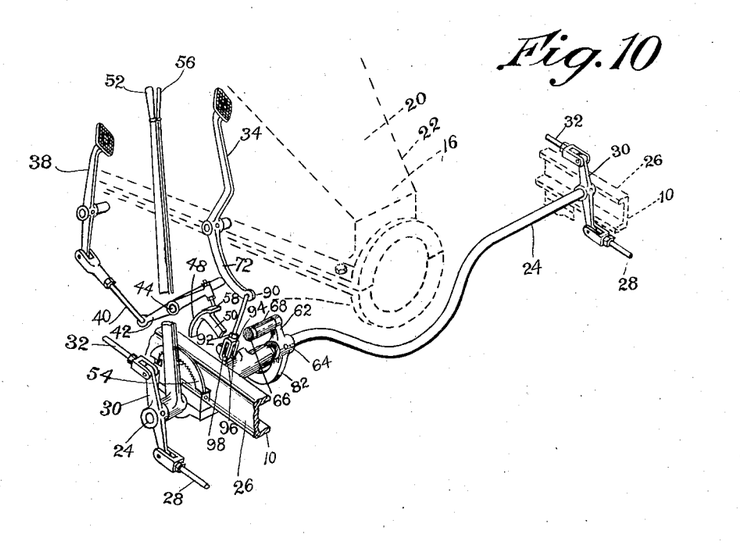
Fig. 10 is a perspective view similar to Fig. 1 of my invention showing a further modified type of a sliding bearing connection between the controller shaft and foot pedal, the hand lever being retracted so as to disconnect the clutch, but not far enough to apply any brakes.
Figure 11:
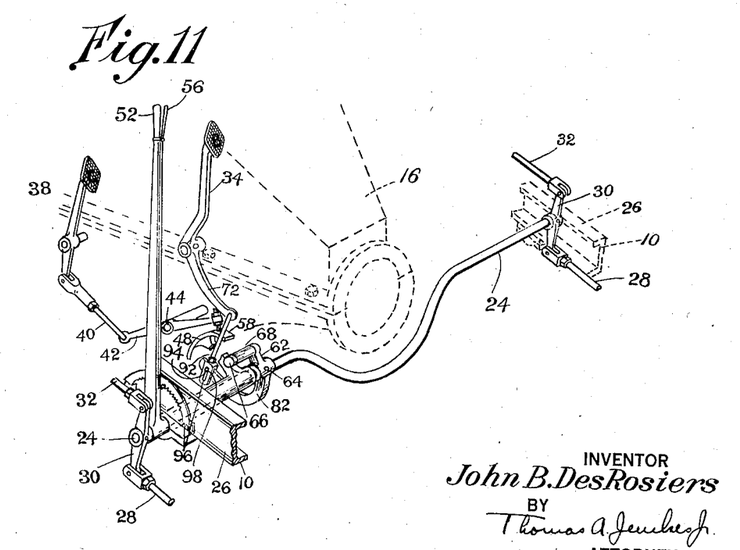
Fig. 11 is a perspective view similar to Fig. 10 of the modified form shown therein with the hand lever retracted to disconnect the clutch and to apply the wheel brakes.
Figure 12:
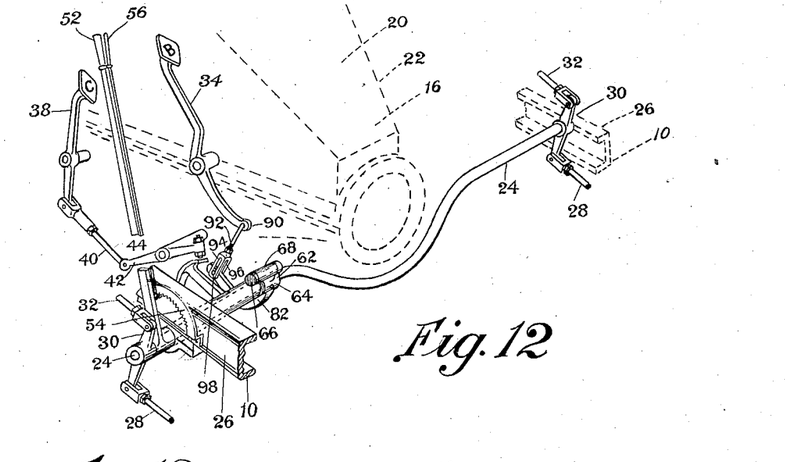
Fig. 12 is a perspective view similar to Fig. 10 of the modified form shown therein with the foot pedal depressed so as to apply both transmission and wheel brakes independently of the clutch.
Figures 13, 14:
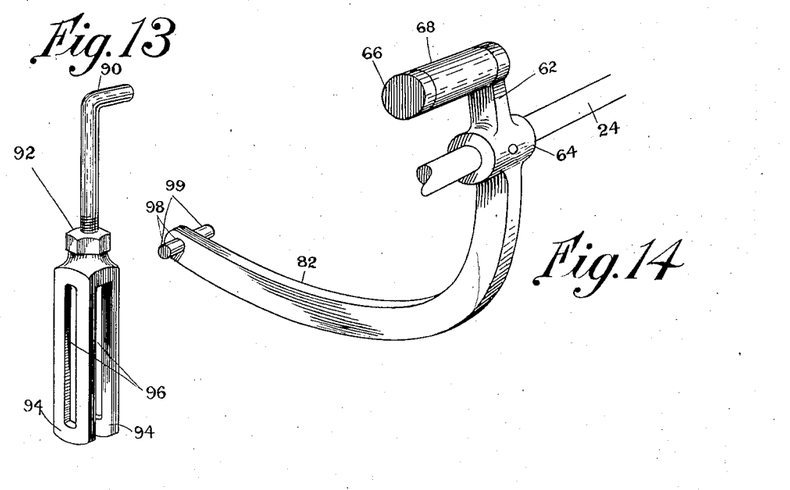
Fig. 13 is a perspective view of the connecting link.
Fig. 14 is a perspective view of the arm attachment for the controller shaft.

In Figs. 9 and 10 I have shown a modified form of means operable on the setting of the driving mechanism brake to rearwardly rotate the controller shaft 24 to apply the wheel brakes 29. In this embodiment I provide the arm 62 with the downward extension 82 and I attach on the lower end thereof the cable 84, the other end of which is suitably attached to the lower end of the downward extension 72 of the foot pedal 34. To secure the desired reversal of motion I pass said cable 84 around the pulley 86 suitably pivoted on a bracket 88 attached to the transmission cover 22. It is obvious that as in the preferred form, depression of the foot pedal 34 will cause simultaneous operation of the transmission brake 20 and rearward rotation of the controller shaft 24 to apply the wheel brakes 29 as explained and that the controller shaft 24 may rearwardly rotate independently of the foot pedal and transmission brake 20, the cable 84 merely slackening as the controller shaft is rotated without affecting the foot pedal 24 or transmission brake 20.

In Figs. 10–14 I have shown my preferred form of a sliding bearing connection between the foot pedal and the controller shaft operable on the setting of the driving mechanism brake to rearwardly rotate the controller shaft 24 to apply the wheel brakes 29. In this embodiment I also provide the arm 62 with the downward extension 82, said downward extension 82 preferably extending arcuately downwardly and forwardly from said shaft 24. The foot pedal 34 is provided with the downward extension 72 preferably extending arcuately downwardly and rearwardly thereof. One end 90 of the link 92 is pivotally joined to the downward extension 72 of the foot pedal 34 in any suitable fashion and the opposite lower end of said link 92 preferably terminates in the ears 94. Said ears 94 are preferably provided with the vertically extending slots 96. The pin 98 is secured transversely of the front end of the downward extension 82 of the arm 62. The ends 90 of said pin are of such a length that they are free to slide in the vertical slots 96 of the ears 94. It is obvious that as the controller shaft 24 is rearwardly rotated, the pin 98 will merely slide upwardly in the slots 96 thereby permitting the controller shaft to be rotated without affecting the transmission brake 20. When however, the foot pedal 34 is depressed, the lower ends of the slots 96 will abut the ends of the pin 98 thereby raising up the extension 82 to cause rotation of the controller shaft to apply the wheel brakes. It is obvious that as in the other forms depression of the foot pedal 34 will cause simultaneous operation of the transmission brake 20 and rearward rotation of the controller shaft 24 to apply the wheel brakes 29 as explained and that the controller shaft 24 may rearwardly rotate independently of the foot pedal and transmission brake 20, the ends 99 of the pin 98 merely sliding upwardly in the vertical slots 96 as the controller shaft is rotated without affecting the foot pedal 34 or transmission brake 20.

Though I have shown my invention as specifically applied to a Ford and adapted to actuate the specific braking means found therein it is obvious that my invention will function if any type of braking means such as an additional wheel brake is substituted for the transmission brake or that the controller shaft 24, by either forward or rearward rotation thereof, may actuate the transmission brake or any type of braking means shown without departing from the spirit and scope of my invention. It is also obvious that my invention may in so far as it concerns the cooperation between two different types of braking means, may cooperate without any clutch connection, that any type of one-way operative means for connecting the foot pedal and controller shaft may be employed, that the transmission brake or other brakes used may be actuated by a hand lever or a foot lever, and that the sleeve 60 may be revolved by a foot lever or a hand lever in either direction without in any way departing from the spirit and scope of my invention. My invention specifically comprises both the attachments, the sleeve 60 and arm 62 heretofore described and broadly as heretofore explained comprises the combination in an automobile of one braking means, a clutch for connecting the power to the driving wheels, a braking means independent of said first braking means, means for operating said first braking means and disengaging the clutch simultaneously independently of said other braking means for sudden stops and means for operating both braking means simultaneously independently of the clutch.

It is understood that my invention is not limited to the specific embodiments shown and that various deviations may be made therefrom without departing from the spirit and scope of the appended claims.

What I claim as new and desire to secure as Letters Patent is:

1. In a motor vehicle, the combination of a braking means, a clutch for connecting the power to the driving wheels, a braking means independent of said first braking means, means for operating said first braking means and disengaging the clutch simultaneously independently of said other braking means and means for operating both braking means simultaneously independently of the clutch.

2. In a motor vehicle, the combination of a wheel brake, a clutch for connecting the power to the driving wheels, a brake upon the driving mechanism, means for operating the wheel brake and disengaging the clutch simultaneously independently of the driving mechanism brake, and means for operating the wheel brake and driving mechanism brake simultaneously independently of the clutch.

3. In a motor vehicle, the combination of a wheel brake, a clutch for connecting the power to the driving wheels, a brake upon the driving mechanism, a rotatable controller shaft for actuating the wheel brake, a sleeve loosely mounted on said shaft, means actuated on rotation of said sleeve to disengage the clutch, means operable from the driver's seat to rotate said sleeve, means to rotate said shaft on rotation of said sleeve, means operable from the driver's seat to actuate the driving mechanism brake and means operable on setting of the driving mechanism brake to rotate said shaft to apply the wheel brake, said means being inoperable to apply the driving mechanism brake on independent rotation of the shaft.

4. In a vehicle, the combination of a wheel brake, a brake upon the driving mechanism, a rotatable controller shaft for actuating the wheel brake, a sleeve loosely mounted on said shaft, means operable from the driver's seat to rotate said sleeve, means to rotate said shaft on rotation of said sleeve, means operable from the driver's seat to actuate the driving mechanism brake and means operable on setting of the driving mechanism brake to rotate said shaft to apply the wheel brake, said means being inoperable to apply the driving mechanism brake on independent rotation of said shaft.

5. In a motor vehicle, the combination of a wheel brake, a clutch for connecting the power to the driving wheels, a brake upon the driving mechanism, a rotatable controller shaft for actuating the wheel brake, a sleeve loosely mounted on said shaft, means actuated on rotation of said sleeve to disengage the clutch, means operable from the driver's seat to rotate said sleeve, means to rotate said shaft on rotation of said sleeve, means operable from the driver's seat to actuate the driving mechanism brake and means operable on setting of the driving mechanism brake to rotate said shaft to apply the wheel brake.

6. In a vehicle, the combination of a wheel brake, a brake upon the driving mechanism, a rotatable controller shaft for actuating the wheel brake, a sleeve loosely mounted on said shaft, means operable from the driver's seat to rotate said sleeve, means to rotate said shaft on rotation of said sleeve, means operable from the driver's seat to actuate the driving mechanism brake and means operable on setting of the driving mechanism brake to rotate said shaft to apply the wheel brake.

7. In a motor vehicle, the combination of braking means, a clutch for connecting the power to the driving wheels, a second braking means independent of said first braking means, a rotatable controller shaft for actuating said first braking means, a sleeve loosely mounted on said shaft, means actuated on rotation of said sleeve to disengage the clutch, means operable from the driver's seat to rotate said sleeve, means to rotate said shaft on rotation of said sleeve, means operable from the driver's seat to actuate said second braking means and means operable on the setting of said second braking means to rotate said shaft to apply said first braking means, said means being inoperable to apply said second braking means on independent rotation of said shaft.

8. In a motor vehicle, the combination of a braking means, a clutch for connecting the power to the driving wheels, a second braking means independent of said first braking means, a rotatable controller shaft for actuating said first braking means, a sleeve loosely mounted on said shaft, means actuated on rotation of said sleeve to disengage the clutch, means operable from the driver's seat to rotate said sleeve, means to rotate said shaft on rotation of said sleeve, means operable from the driver's seat to actuate said second braking means and means operable on the setting of said second braking means to rotate said shaft to apply said first braking means.

9. In a vehicle, the combination of a braking means, a second braking means independent of said first braking means, a rotatable controller shaft for actuating said first braking means, a sleeve loosely mounted on said shaft, means operable from the driver's seat to rotate said sleeve, means to rotate said shaft on rotation of said sleeve, means operable from the driver's seat to actuate said second braking means and means operable on the setting of said second braking means to rotate said shaft to apply said first braking means.

10. In a motor vehicle, the combination of a wheel brake, a clutch for connecting the power to the driving wheels, a brake upon the driving mechanism, a rotatable controller shaft for actuating the wheel brake, a sleeve loosely mounted on said shaft, means operable from the driver's seat to rearwardly rotate said sleeve, a speed lever for disengaging the clutch mounted on said sleeve, an arm rigidly secured to said shaft having a rod projecting laterally therefrom adapted to abut said speed lever to cause said shaft to rotate on rearward rotation on said sleeve, means to actuate the driving mechanism brake and means operable on the setting of the driving mechanism brake to rotate said shaft to apply the wheel brake, said means being inoperable to apply the driving mechanism brake on independent rotation of said shaft.

11. In a motor vehicle, the combination of a wheel brake, a clutch for connecting the power to the driving wheels, a brake upon the driving mechanism, a rotatable controller shaft for actuating the wheel brake, a sleeve loosely mounted on said shaft, means operable from the driver's seat to rearwardly rotate said sleeve, a speed lever for disengaging the clutch mounted on said sleeve, an arm rigidly secured to said shaft having a rod projecting laterally therefrom adapted to abut said speed lever to cause said shaft to rotate on rearward rotation of said sleeve, means to actuate the driving mechanism brake and means operable on the setting of the driving mechanism brake to rearwardly rotate said shaft to apply the wheel brake.

12. In a motor vehicle, the combination of a braking means, a clutch for connecting the power to the driving wheels, a second braking means independent of said first braking means, a rotatable controller shaft for actuating said first braking means, a sleeve loosely mounted on said shaft, means operable from the driver's seat to rotate said sleeve, a speed lever for disengaging the clutch mounted on said sleeve, an arm rigidly secured to said shaft having a rod projecting laterally therefrom to abut said speed lever to cause said shaft to rotate on rotation of said sleeve, means to actuate said second braking means and means operable on the setting of said second braking means to rotate said shaft to apply said first braking means, said means being inoperable to apply said second braking means on independent rotation of said shaft.

13. In a motor vehicle, the combination of a braking means, a clutch for connecting the power to the driving wheels, a second braking means independent of said first braking means, a rotatable controller shaft for actuating said first braking means, a sleeve loosely mounted on said shaft, means operable from the driver's seat to rearwardly rotate said sleeve, a speed lever for disengaging the clutch mounted on said sleeve, an arm rigidly secured to said shaft having a rod projecting laterally therefrom to abut said speed lever to cause said shaft to rotate on rearward rotation of said sleeve, means to actuate said second braking means and means operable on setting of said second braking means to rearwardly rotate said shaft to apply said first braking means.

14. In a motor vehicle, the combination of a wheel brake, a clutch for connecting the power to the driving wheels, a brake upon the driving mechanism, a rotatable controller shaft for actuating the wheel brake, a sleeve loosely mounted on said shaft, a hand lever projecting upwards from said sleeve, a speed lever for disengaging the clutch mounted on said sleeve, an arm rigidly secured to said shaft having a rod projecting laterally therefrom adapted to abut said speed lever to cause said shaft to rotate on rearward rotation of said sleeve, a foot lever to actuate the driving mechanism brake and means including a sliding bearing connecting said foot lever and controller shaft to rearwardly rotate said shaft to apply the wheel brake on depression of said foot lever, said means being inoperable to apply the driving mechanism brake on independent rotation of said shaft.

15. In a vehicle, the combination of a wheel brake, a brake upon the driving mechanism, a rotatable controller shaft for actuating the wheel brake, a sleeve loosely mounted on said shaft, a hand lever projecting upwards from said sleeve, means to rotate said shaft on rotation of said sleeve, a foot lever to actuate the driving mechanism brake and means including a sliding bearing connecting said foot lever and controller shaft to rotate said shaft to apply the wheel brake on depression of said foot lever, said means being inoperable to apply the driving mechanism brake on independent rotation of said shaft.

16. In a motor vehicle, the combination of a wheel brake, a clutch for connecting the power to the driving wheels, a brake upon the driving mechanism, a rotatable controller shaft for actuating the wheel brake, a sleeve loosely mounted on said shaft, a hand lever projecting upwards from said sleeve, a speed lever for disengaging the clutch mounted on said sleeve, an arm rigidly secured to said shaft having a rod projecting laterally therefrom adapted to abut said speed lever to cause said shaft to rotate on rotation of said sleeve, a foot lever to actuate the driving mechanism brake and means including a sliding bearing connecting said foot lever and controller shaft to rotate said shaft to apply the wheel brake on depression of said foot lever.

17. In a vehicle, the combination of a wheel brake, a brake upon the driving mechanism, a rotatable controller shaft for actuating the wheel brake, a sleeve loosely mounted on said shaft, a hand lever projecting upwards from said sleeve, means to rotate said shaft on rotation of said sleeve, a foot lever to actuate the driving mechanism brake and means including a sliding bearing connecting said foot lever and controller shaft to rotate said shaft to apply the wheel brake on depression of said foot lever.

18. In a motor vehicle, the combination of a braking means, a clutch for connecting the power to the driving wheels, a second braking means independent of said first braking means, a rotatable controller shaft for actuating said first braking means, a sleeve loosely mounted on said shaft, a hand lever projecting upwards from said sleeve, a speed lever for disengaging the clutch mounted on said sleeve, an arm rigidly secured to said shaft having a rod projecting laterally therefrom adapted to abut said speed lever to cause said shaft to rotate on rearward rotation of said sleeve, a foot lever to actuate said second braking means and means including a sliding bearing connecting said foot lever and controller shaft to rearwardly rotate said shaft to apply said first braking means on depression of said foot lever, said means being inoperable to apply said second braking means on independent rotation of said shaft.

19. In a vehicle, the combination of a braking means, a second braking means independent of said first braking means, a rotatable controller shaft for actuating said first braking means, a sleeve loosely mounted on said shaft, a hand lever projecting upwards from said sleeve, means to rotate said shaft on rotation of said sleeve, a foot lever to actuate said second braking means and means including a sliding bearing connecting said foot lever and controller shaft to rotate said shaft to apply said first braking means on depression of said foot lever, said means being inoperable to apply the second braking means on independent rotation of said shaft.

20. In a vehicle, the combination of a braking means, a second braking means independent of said first braking means, a rotatable controller shaft for actuating said first braking means, a sleeve loosely mounted on said shaft, a hand lever projecting upwards from said sleeve, means to rotate said shaft on rotation of said sleeve, a foot lever to actuate said second braking means and means including a sliding bearing connecting said foot lever and controller shaft to rotate said shaft to apply said first braking means on depression of said foot lever.

21. In a motor vehicle, the combination of a wheel brake, a clutch for connecting the power to the driving wheels, a brake upon the driving mechanism, a rotatable controller shaft for actuating the wheel brake, a sleeve loosely mounted on said shaft, a hand lever projecting upwards from said sleeve, a speed lever for disengaging the clutch mounted on said sleeve, an arm rigidly secured to said shaft having a rod projecting laterally therefrom adapted to abut said speed lever to cause said shaft to rotate on rearward rotation of said sleeve and an extension projecting arcuately downwardly and forwardly therefrom, a foot lever to actuate the driving mechanism brake, and a link having one end thereof pivotally joined to a downward extension of said lever and the other end thereof pivotally joined to said arm extension.

22. In a vehicle, the combination of a wheel brake, a brake upon the driving mechanism, a rotatable controller shaft for actuating the wheel brake, a sleeve loosely mounted on said shaft, a hand lever projecting upwards from said sleeve, means to rotate said shaft on rotation of said sleeve, a foot lever to actuate the driving mechanism brake, an arm mounted on said shaft having a portion extending arcuately downwardly and forwardly from said shaft and a link having one end thereof pivotally joined to a downward extension of said foot lever and the other end pivotally joined to said arm extension.

23. In a motor vehicle, the combination of a braking means, a clutch for connecting the power to the driving wheels, a second braking means, a rotatable controller shaft for actuating said first braking means, a sleeve loosely mounted on said shaft, a hand lever projecting upwards from said sleeve, a speed lever for disengaging the clutch mounted on said sleeve and an arm rigidly secured to said shaft having a rod projecting laterally therefrom adapted to abut said speed lever to cause said shaft to rotate on rotation of said sleeve and an extension projecting arcuately downwardly and forwardly from said shaft, a foot lever to actuate said second braking means, and a link having one end thereof pivotally joined to a downward extension of said foot lever and the other end thereof pivotally joined to said arm extension.

24. In a vehicle, the combination of a braking means, a second braking means, a rotatable controller shaft for actuating said second braking means, a sleeve loosely mounted on said shaft, a hand lever projecting upwards from said sleeve, means to rotate said shaft on rotation of said sleeve, an arm secured to said shaft projecting arcuately downwardly and forwardly from said shaft, a foot lever to actuate said first braking means, and a link having one end thereof pivotally joined to a downward extension of said foot lever and the other end thereof pivotally joined to said arm extension.

25. In a motor vehicle, the combination of a wheel brake, a clutch for connecting the power to the driving wheels, a brake upon the driving mechanism, a rotatable controller shaft for actuating the wheel brake, a sleeve loosely mounted on said shaft, a hand lever projecting upwards from said sleeve, a speed lever for disengaging the clutch mounted on said sleeve, an arm rigidly secured to said shaft having a rod projecting laterally therefrom adapted to abut said speed lever to cause said shaft to rotate on rearward rotation of said sleeve and an extension projecting arcuately downwardly and forwardly from said shaft, a foot lever to actuate the driving mechanism brake, a link having one end thereof pivotally joined to a downward extension of said foot lever and on its opposite end two ears projecting downwardly therefrom having vertical slots therein and a pin mounted transversely on the front end of said arm extension, the ends thereof being movable in said slots in said ears.

26. In a vehicle, the combination of a wheel brake, a brake upon the driving mechanism, a rotatable controller shaft for actuating the wheel brake, a sleeve loosely mounted on said shaft, a hand lever projecting upwards from said sleeve, means to rotate said shaft on rotation of said sleeve, an arm rigidly secured to said shaft extending arcuately downwardly and forwardly from said shaft, a foot lever to actuate the driving mechanism brake, a link having one end thereof pivotally joined to a downward extension of the lever and having at its opposite end two ears projecting downwardly therefrom having vertical slots therein and a pin mounted transversely on the front end of said arm, the ends thereof being slidable in said slots in said ears.

27. In a motor vehicle, the combination of a braking means, a clutch for connecting the power to the driving wheels, a second braking means independent of said first braking means, a rotatable controller shaft for actuating said first braking means, a sleeve loosely mounted on said shaft, a hand lever projecting upwards from said sleeve, a speed lever for disengaging the clutch mounted on said sleeve, an arm rigidly secured to said shaft having a rod projecting laterally therefrom adapted to abut said speed lever to cause said shaft to rotate on rotation of said sleeve and an extension projecting arcuately downwardly and forwardly from said shaft, a foot lever to actuate said second braking means, a link having one end thereof pivotally joined to a downward extension of said foot lever and at the other end two ears projecting downwardly therefrom having vertical slots therein and a pin mounted transversely of the front end of said arm extension, the ends thereof being slidable in said slots in said ears.

28. In a vehicle, the combination of a braking means, a second braking means independent of said first braking means, a rotatable controller shaft for actuating said first braking means, a sleeve loosely mounted on said shaft, a hand lever projecting upwards from said sleeve, means to rotate said shaft on rotation of said sleeve, an arm rigidly secured to said shaft extending arcuately downwardly and forwardly from said shaft, a link having one end thereof pivotally joined to a downward extension of said foot lever and having at the opposite end thereof two ears projecting downwardly therefrom having vertical slots therein and a pin transversely mounted in the front end of said arm slidable in said slots in said ears.

29. An attachment for automobile brake controller shafts comprising an arm having a collar for attachment to the controller shaft and a rod projecting laterally therefrom parallel to said collar.

30. An attachment for automobile brake controller shafts comprising a collar for attachment to the controller shaft, an arm projecting vertically upwardly therefrom having a rod projecting laterally therefrom and an arm extending arcuately downwardly and forwardly from said collar when attached to said controller shaft shaped to rotate said shaft on an upward pull on the end thereof.

In testimony whereof I affix my signature.

JOHN B. DES ROSIERS.